(12) United States Patent
Wang et al.

(10) Patent No.: US 10,997,764 B2
(45) Date of Patent: May 4, 2021

(54) METHOD AND APPARATUS FOR GENERATING ANIMATION

(71) Applicant: Beijing Baidu Netcom Science and Technology Co., Ltd, Beijing (CN)

(72) Inventors: Jianxiang Wang, Beijing (CN); Fuqiang Lyu, Beijing (CN); Xiao Liu, Beijing (CN); Jianchao Ji, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/564,546

(22) Filed: Sep. 9, 2019

(65) Prior Publication Data

US 2019/0392625 A1 Dec. 26, 2019

(30) Foreign Application Priority Data

Nov. 6, 2018 (CN) .......................... 201811315036.3

(51) Int. Cl.
| | |
|---|---|
| *G06T 13/20* | (2011.01) |
| *G06N 20/00* | (2019.01) |
| *G06K 9/62* | (2006.01) |
| *G06T 13/40* | (2011.01) |
| *G10L 17/14* | (2013.01) |

(52) U.S. Cl.
CPC .......... *G06T 13/205* (2013.01); *G06K 9/6256* (2013.01); *G06N 20/00* (2019.01); *G06T 13/40* (2013.01); *G10L 17/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,661,418 | B1 * | 12/2003 | McMillan | ............. G06T 13/205 |
| | | | | 345/473 |
| 2006/0221084 | A1 * | 10/2006 | Yeung | ................... G06T 13/205 |
| | | | | 345/474 |
| 2012/0280974 | A1 * | 11/2012 | Wang | ...................... G10L 21/10 |
| | | | | 345/419 |

* cited by examiner

*Primary Examiner* — Said Broome
(74) *Attorney, Agent, or Firm* — Kilpatrick Townsend & Stockton LLP

(57) ABSTRACT

Embodiments of the present disclosure provide a method and apparatus for generating an animation. A method may include: extracting an audio feature from target speech segment by segment, to aggregate the audio feature into an audio feature sequence composed of an audio feature of each speech segment; inputting the audio feature sequence into a pre-trained mouth-shape information prediction model, to obtain a mouth-shape information sequence corresponding to the audio feature sequence; generating, for mouth-shape information in the mouth-shape information sequence, a face image including a mouth-shape object indicated by the mouth-shape information; and using the generated face image as a key frame of a facial animation, to generate the facial animation.

18 Claims, 5 Drawing Sheets

METHOD AND APPARATUS FOR GENERATING ANIMATION

CROSS-REFERENCE TO RELATED APPLICATIONS

This application claims priority to Chinese Patent Application No. 201811315036.3, filed on Nov. 6, 2018, titled "Method and apparatus for generating animation," which is hereby incorporated by reference in its entirety.

TECHNICAL FIELD

Embodiments of the present disclosure relate to the field of computer technology, and specifically to a method and apparatus for generating an animation.

BACKGROUND

A virtual portrait mouth-shape synchronization technology is intended to synthesize, for a given speech input, a highly realistic mouth shape synchronized with the speech for a virtual portrait by using a computer technology, and to be able to satisfy real-time requirements.

A related virtual portrait mouth-shape synchronization technology usually relies on a professional animator, to manually set a mouth-shape key frame for the virtual portrait according to the inputted speech, thereby implementing the mouth-shape synchronization.

SUMMARY

Embodiments of the present disclosure propose a method and apparatus for generating an animation.

In a first aspect, the embodiments of the present disclosure provide a method for generating an animation. The method includes: extracting an audio feature from target speech segment by segment, to aggregate the audio feature into an audio feature sequence composed of an audio feature of each speech segment; inputting the audio feature sequence into a pre-trained mouth-shape information prediction model, to obtain a mouth-shape information sequence corresponding to the audio feature sequence, audio features in the audio feature sequence being in one-to-one correspondence with mouth-shape information in the mouth-shape information sequence; generating, for the mouth-shape information in the mouth-shape information sequence, a face image including a mouth-shape object indicated by the mouth-shape information; and using the generated face image as a key frame of a facial animation, to generate the facial animation.

In some embodiments, the mouth-shape information in the mouth-shape information sequence includes a probability of a corresponding speech segment matching each preset phoneme (e.g., each of one or more preset phonemes). The generating, for the mouth-shape information in the mouth-shape information sequence, a face image including a mouth-shape object indicated by the mouth-shape information includes: using, for the mouth-shape information in the mouth-shape information sequence, a preset phoneme corresponding to a maximum value of the probability in the mouth-shape information as a target phoneme, and determining, based on preset corresponding relationship information, a mouth-shape object corresponding to the target phoneme to generate a face image including the mouth-shape object, the corresponding relationship information representing a corresponding relationship between the phoneme and the mouth-shape object.

In some embodiments, the mouth-shape information prediction model is obtained by following training: extracting a sample set, where a sample in the sample set includes sample speech and a phonemic annotation for each speech segment of the sample speech; extracting, for the sample in the sample set, an audio feature from the sample speech of the sample segment by segment, to aggregate the audio feature into an audio feature sequence of the sample; and using the audio feature sequence of the sample as an input and using the phonemic annotation in the sample as an output, to train and obtain the mouth-shape information prediction model using a machine learning method.

In some embodiments, the mouth-shape information in the mouth-shape information sequence includes key point information of a mouth area. The generating, for the mouth-shape information in the mouth-shape information sequence, a face image including a mouth-shape object indicated by the mouth-shape information includes: using, for the mouth-shape information in the mouth-shape information sequence, a key point indicated by the key point information in the mouth-shape information as a skeleton point of the mouth area of a face, to generate the face image.

In some embodiments, the mouth-shape information prediction model is obtained by following training: extracting a sample set, where a sample in the sample set includes a sample video and sample speech synchronously recorded; performing, for the sample in the sample set, a face detection and a face key point detection on frames in the sample video in the sample in sequence, to obtain key point information of a mouth area of each frame and aggregate the key point information into a key point information sequence; extracting an audio feature from the sample speech of the sample segment by segment, to aggregate the audio feature into an audio feature sequence of the sample, key point information in the key point information sequence being in one-to-one correspondence with audio features in the audio feature sequence of the sample; updating the key point information sequence and the audio feature sequence of the sample based on a preset delay step size; and using the updated audio feature sequence as an input and using the updated key point information sequence as an output, to train and obtain the mouth-shape information prediction model using the machine learning method.

In some embodiments, the updating the key point information sequence and the audio feature sequence of the sample based on a preset delay step size includes: deleting an audio feature, having a sequence number not greater than the delay step size, in the audio feature sequence of the sample, to update the audio feature sequence of the sample; determining a number of audio features in the updated audio feature sequence; and deleting key point information, having a sequence number greater than the number of audio features, in the key point information sequence, to update the key point information sequence.

In a second aspect, the embodiments of the present disclosure provide an apparatus for generating an animation. The apparatus includes: an aggregating unit, configured to extract an audio feature from target speech segment by segment, to aggregate the audio feature into an audio feature sequence composed of an audio feature of each speech segment; an inputting unit, configured to input the audio feature sequence into a pre-trained mouth-shape information prediction model, to obtain a mouth-shape information sequence corresponding to the audio feature sequence, audio features in the audio feature sequence being in one-to-one correspondence with mouth-shape information in the mouth-shape information sequence; a first generating unit, configured to generate, for the mouth-shape information in the mouth-shape information sequence, a face image including a mouth-shape object indicated by the mouth-shape information; and a second generating unit, configured to use the generated face image as a key frame of a facial animation, to generate the facial animation.

In some embodiments, the mouth-shape information in the mouth-shape information sequence includes a probability of a corresponding speech segment matching each preset phoneme. The first generating unit is further configured to: use, for the mouth-shape information in the mouth-shape information sequence, a preset phoneme corresponding to a maximum value of the probability in the mouth-shape information as a target phoneme, and determine, based on preset corresponding relationship information, a mouth-shape object corresponding to the target phoneme to generate a face image including the mouth-shape object, the corresponding relationship information representing a corresponding relationship between the phoneme and the mouth-shape object.

In some embodiments, the mouth-shape information prediction model is obtained by following training: extracting a sample set, where a sample in the sample set includes sample speech and a phonemic annotation for each speech segment of the sample speech; extracting, for the sample in the sample set, an audio feature from the sample speech of the sample segment by segment, to aggregate the audio feature into an audio feature sequence of the sample; and using the audio feature sequence of the sample as an input and using the phonemic annotation in the sample as an output, to train and obtain the mouth-shape information prediction model using a machine learning method.

In some embodiments, the mouth-shape information in the mouth-shape information sequence includes key point information of a mouth area. The first generating unit is further configured to: use, for the mouth-shape information in the mouth-shape information sequence, a key point indicated by the key point information in the mouth-shape information as a skeleton point of the mouth area of a face, to generate the face image.

In some embodiments, the mouth-shape information prediction model is obtained by following training: extracting a sample set, where a sample in the sample set includes a sample video and sample speech synchronously recorded; performing, for the sample in the sample set, a face detection and a face key point detection on frames in the sample video in the sample in sequence, to obtain key point information of a mouth area of each frame and aggregate the key point information into a key point information sequence; extracting an audio feature from the sample speech of the sample segment by segment, to aggregate the audio feature into an audio feature sequence of the sample, the key point information in the key point information sequence being in one-to-one correspondence with audio features in the audio feature sequence of the sample; updating the key point information sequence and the audio feature sequence of the sample based on a preset delay step size; and using the updated audio feature sequence as an input and using the updated key point information sequence as an output, to train and obtain the mouth-shape information prediction model using the machine learning method.

In some embodiments, the updating the key point information sequence and the audio feature sequence of the sample based on a preset delay step size includes: deleting an audio feature, having a sequence number not greater than the delay step size, in the audio feature sequence of the sample, to update the audio feature sequence of the sample; determining a number of audio features in the updated audio feature sequence; and deleting key point information, having a sequence number greater than the number of audio features, in the key point information sequence, to update the key point information sequence.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method described in any embodiment in the first aspect.

In a fourth aspect, the embodiments of the present disclosure provide a computer readable medium storing a computer program. The program, when executed by a processor, implements the method described in any embodiment in the first aspect.

According to the method and apparatus for generating an animation provided by the embodiments of the present disclosure, the audio feature is extracted from the target speech segment by segment, to be aggregated into the audio feature sequence composed of the audio feature of the each speech segment. By inputting the audio feature sequence into the pre-trained mouth-shape information prediction model, the mouth-shape information sequence corresponding to the audio feature sequence may be obtained. Then, the face image including the mouth-shape object may be generated based on the mouth-shape information in the mouth-shape information sequence. Finally, the generated face image may be used as the key frame of the facial animation, to generate the facial animation. Accordingly, the corresponding key frame may be automatically generated according to the speech feature extracted from the target speech, thus enriching the animation generation modes, and implementing the synchronization of the mouth shape and the speech in the generated animation.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
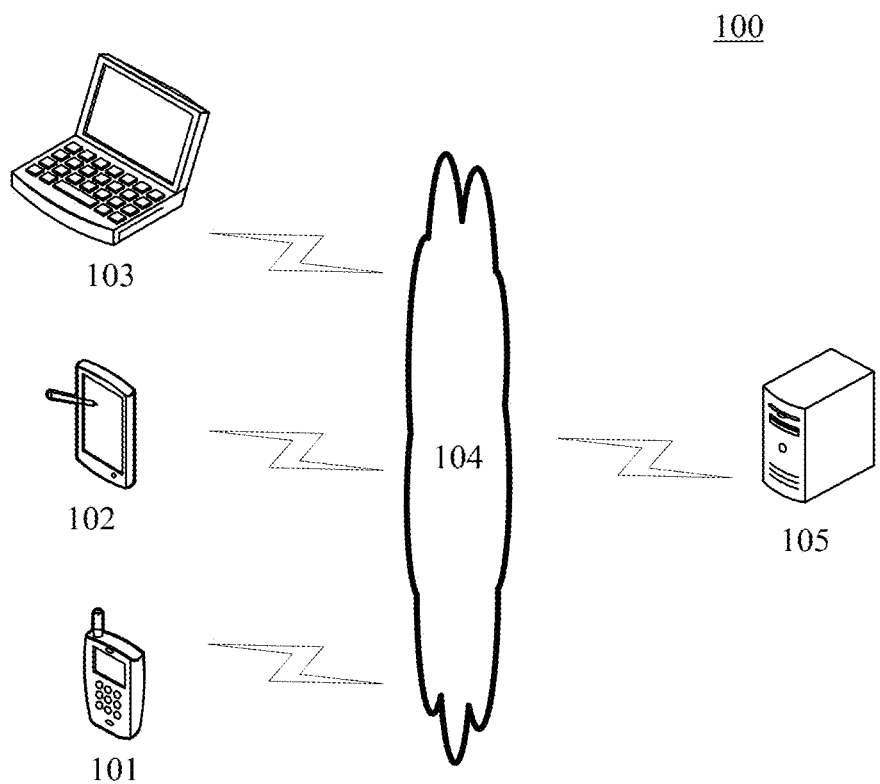
FIG. 1 is a diagram of an exemplary system architecture in which embodiments of the present disclosure may be applied.

FIG. 1 shows an exemplary system architecture 100 in which a method for generating an animation or an apparatus for generating an animation according to the embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various communication client applications (e.g., a speech interaction application, an animation production application, a video and audio playing application, a search application, an instant communication tool, and social platform software) may be installed on the terminal devices 101, 102 and 103.

The terminal devices 101, 102 and 103 may be hardware or software. When the terminal devices 101, 102 and 103 are hardware, the terminal devices 101, 102 and 103 may be various electronic devices having a display screen and supporting the playing of an audio and an video, the electronic devices including, but not limited to, a smart phone, a tablet computer, an e-book reader, an MP4 (moving picture experts group audio layer IV) player, a laptop portable computer and a desktop computer. When the terminal devices 101, 102 and 103 are software, the terminal devices 101, 102 and 103 may be installed in the above-listed electronic devices. The terminal devices may be implemented as a plurality of pieces of software or a plurality of software modules (e.g., software or software modules for providing a distributed service), or as a single piece of software or a single software module, which will not be specifically defined here.

When the terminal devices 101, 102 and 103 are hardware, an audio collection device may be installed thereon. The audio collection device may be any device capable of performing an audio collection functionality, for example, a microphone. The user may collect speech using the audio collection device on the terminal devices 101, 102 and 103.

The terminal devices 101, 102, and 103 may perform processing such as a feature extraction and an analysis on the target speech collected by the terminal devices, to obtain a processing result (e.g., a face image including a mouth-shape object). In addition, the terminal devices 101, 102 and 103 may alternatively perform an animation using the animation application installed thereon, to obtain a facial animation.

The server 105 may be a server providing various kinds of services, for example, a management server for storing and managing files such as a speech file and an animation file uploaded by the terminal devices 101, 102 and 103. The management server may further store a large amount of image material (e.g., virtual three-dimensional face material), and may send the material to the terminal devices 101, 102 and 103.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of pieces of software or a plurality of software modules (e.g., software or software modules for providing a distributed service), or as a single piece of software or a single software module, which will not be specifically defined here.

It should be noted that a method for generating an animation provided by the embodiments of the present disclosure is generally performed by the terminal devices 101, 102 and 103. Correspondingly, the apparatus for generating an animation is generally provided in the terminal devices 101, 102 and 103.

It should be noted that in the case where the terminal devices 101, 102 and 103 may implement the relevant functionalities of the server 105, the server 105 may not be provided in the system architecture 100.

It should also be noted that the server 105 may also perform processing such as the feature extraction and the analysis on the speech stored by the server or the speech uploaded by the terminal devices 101, 102 and 103, and return the processing result (e.g., a facial animation) to the terminal devices 101, 102 and 103. At this point, the method for generating an animation provided by the embodiments of the present disclosure may alternatively be performed by the server 105. Correspondingly, the apparatus for generating an animation may alternatively be provided in the server 105.

It should be appreciated that the numbers of the terminal devices, the networks, and the servers in FIG. 1 are merely illustrative. Any number of terminal devices, networks and servers may be provided based on actual requirements.

Figure 2:
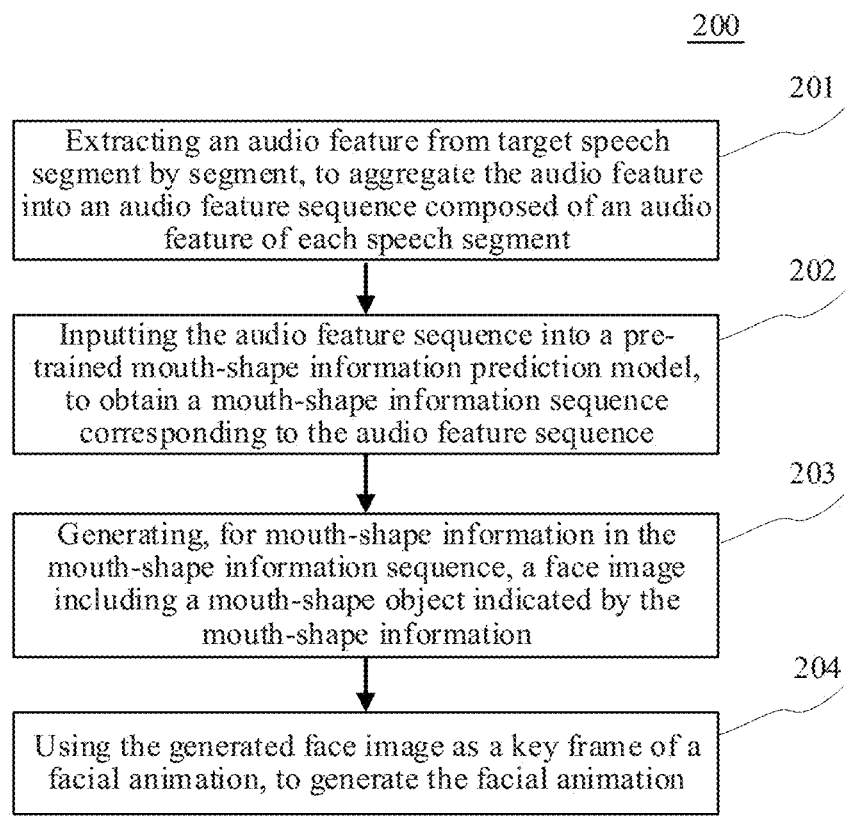
FIG. 2 is a flowchart of a method for generating animation according to an embodiment of the present disclosure.

Further referring to FIG. 2, FIG. 2 illustrates a flow 200 of a method for generating an animation according to an embodiment of the present disclosure. The method for generating an animation includes the following steps.

Step 201, extracting an audio feature from target speech segment by segment, to aggregate the audio feature into an audio feature sequence composed of an audio feature of each speech segment.

In this embodiment, an executing body (e.g., the terminal devices 101, 102 and 103 shown in FIG. 1) of the method for generating an animation may first acquire the speech currently to be processed as the target speech. The target speech may be speech recorded by the executing body, or speech pre-stored in the executing body. The target speech may alternatively be acquired from other electronic devices by the executing body by means of a wired connection or a wireless connection. Then, the executing body may extract the audio feature from the target speech segment by segment, to aggregate the audio feature into the audio feature sequence composed of the audio feature of the each speech segment.

Here, the feature extraction on the speech segment (e.g., a speech segment of 25 milliseconds, each speech segment may be regarded as one frame) may be performed at a preset interval (e.g., a data amount of 10 milliseconds). The time length of the each speech segment is the same. As an example, a speech segment from the beginning time to the $25^{th}$ millisecond in the target speech may be first used as a first speech segment, and the audio feature of the first speech segment may be extracted. Then, the speech segment from the 10$^{th}$ millisecond to the 35$^{th}$ millisecond may be used as a second speech segment, and the audio feature of the second speech segment may be extracted. Next, the speech segment from the 20$^{th}$ millisecond to the 45$^{th}$ millisecond may be used as a third speech segment, and the audio feature of the third speech segment may be extracted, and so on. Finally, the audio features of the speech segments are sequentially aggregated, to generate the audio feature sequence.

In this embodiment, the executing body may extract a feature in the speech segment according to various audio feature extraction methods. In practice, the feature may refer to characteristics or properties of objects of a certain kind that are distinguished from objects of other kinds, or a collection of such characteristics and properties. The feature is data that can be extracted through a measurement or processing. For an audio, the audio feature may refer to a feature of the audio that distinguishes the audio from other types of audios. For example, the feature may include, but not limited to, an MFCC (Mel-scale Frequency Cepstral Coefficients) feature, an MFB (Mel Filter Bank) feature, an SSC (Spectral Subband Centroid) feature.

As an example, the MFCC feature may be extracted through the following steps. First, the speech segment may be converted from the time domain to the frequency domain using a Fast Fourier transformation (FFT), to obtain an energy spectrum. Then, a convolution computation may be performed on the energy spectrum according to a Mel scale distribution using a triangular bandpass filtering method, to obtain a plurality of output logarithmic energies. Finally, a discrete cosine transform (DCT) is performed on the vector composed of the plurality of output logarithmic energies, to generate the MFCC feature.

It should be noted that the audio feature extracted from the each speech segment may be represented in the form of a vector. As an example, for the each speech segment, a 13-dimensional MFCC feature, a 26-dimensional MFB feature and a 26-dimensional SSC feature may be extracted. The executing body may merge the 65-dimensional features, to obtain a 65-dimensional feature vector. For the each speech segment, the obtained 65-dimensional feature vector is used as the audio feature of the speech segment, and the audio features of the speech segments are sequentially aggregated, and thus, the audio feature sequence of the target speech may be obtained.

Step 202, inputting the audio feature sequence into a pre-trained mouth-shape information prediction model, to obtain a mouth-shape information sequence corresponding to the audio feature sequence.

In this embodiment, the executing body may input the audio feature sequence to the pre-trained mouth-shape information prediction model, to obtain the mouth-shape information sequence corresponding to the audio feature sequence. The audio features in the audio feature sequence are in one-to-one correspondence with the mouth-shape information in the mouth-shape information sequence. Here, the mouth-shape information prediction model may be used to represent a corresponding relationship between the audio feature sequence and the mouth-shape information sequence. For example, the mouth-shape information prediction model may be a corresponding relationship table pre-established by a technician based on the statistics on a large amount of data. The corresponding relationship table may represent a corresponding relationship between an audio feature and mouth-shape information. The mouth-shape information corresponding to the each audio feature in the audio feature sequence is sequentially looked up from the corresponding relationship table, and thus the mouth-shape information sequence corresponding to the audio feature sequence is obtained.

Here, the mouth-shape information may be various kinds of information for determining or assisting in determining the mouth-shape object corresponding to the speech segment or the audio feature of the speech segment. As an example, the mouth-shape information may be a phoneme matching the speech segment, or a probability that the speech segment matches each preset phoneme (e.g., each of one or more preset phonemes), or key point information of a mouth area. Moreover, the mouth-shape information may alternatively be a combination of the phoneme, the probability and the key point information, and is not limited to the phoneme, the probability and the key point information.

In some alternative implementations of this embodiment, the mouth-shape information prediction model may be obtained by performing supervised training on an existing model for the audio feature extraction based on a sample set (including sample speech and including mouth-shape information corresponding to each speech segment for indicating the sample speech), using a machine learning method. As an example, the model may use an RNN (Recurrent Neural Network), an LSTM (Long Short-Term Memory), a Hidden Markov Model (HMM), or the like. It should be noted that the machine learning method and the supervised training method are well-known technologies widely studied and applied at present, which will not be repeatedly described herein.

Step 203, generating, for mouth-shape information in the mouth-shape information sequence, a face image including a mouth-shape object indicated by the mouth-shape information.

In this embodiment, for the mouth-shape information in the mouth-shape information sequence, the executing body may generate the face image including the mouth-shape object indicated by the mouth-shape information. Specifically, first, for each piece of mouth-shape information in the mouth-shape information sequence, the executing body may determine the mouth-shape object indicated by the mouth-shape information in various ways. As an example, the executing body may store the corresponding relationship between the mouth-shape information and the mouth-shape object. For the mouth-shape information in the mouth-shape information sequence, the executing body may look up the mouth-shape object corresponding to the mouth-shape information according to the corresponding relationship. In practice, the mouth-shape object may be related information for constituting the mouth area in the face image, for example, the information may include, but not limited to, a mouth contour, a tooth contour, a nose contour, a chin contour, a cheek contour, etc. Here, the mouth area may be an area related to the movement of the mouth, for example, mouth, nose, chin, tooth, cheeks.

Then, for the each piece of mouth-shape information in the mouth-shape information sequence, the executing body may generate a face image including the mouth-shape object indicated by the mouth-shape information. Here, the executing body may pre-store information of other face parts other than the mouth area. After the mouth-shape object matching the mouth-shape information is obtained, the each piece of information may be directly aggregated, and the face image may be generated using an existing animation production tool (e.g., Unity 3D and Maya).

In some alternative implementations of this embodiment, the mouth-shape information in the mouth-shape information sequence may include the probability that the corresponding speech segment matches the each preset phoneme (e.g., each of one or more preset phonemes). Here, the phoneme is the smallest phonetic unit divided according to the natural attribute of the speech. From the perspective of acoustic properties, the phoneme is the smallest phonetic unit divided from the point of view of the sound qualities. A word or term may be comprised of one or more syllables, and a syllable may be comprised of one or more phonemes. Each phoneme corresponds to a particular pronunciation, thus corresponding to a particular mouth shape. Here, the phoneme may adopt an representation in TIMIT (The DARPA TIMIT Acoustic-Phonetic Continuous Speech Corpus). The executing body may store corresponding relationship information for representing a corresponding relationship between each phoneme and the mouth-shape object.

In some alternative implementations of this embodiment, certain phonemes (e.g., the phonemes "p," "b" and "m") are very similar in mouth shape when pronounced. Therefore, the phonemes having similar mouth shapes when pronounced may be combined as a phoneme group. The executing body may store corresponding relationship information for representing a corresponding relationship between each phoneme group and the mouth-shape object.

In some alternative implementations of this embodiment, when the mouth-shape information in the mouth-shape information sequence includes the probability that the corresponding speech segment matches the each preset phoneme, for the mouth-shape information in the mouth-shape information sequence, the executing body may generate the face image according to the following steps: first, the preset phoneme corresponding to the maximum value of the probability in the mouth-shape information may be used as a target phoneme; then, the mouth-shape object corresponding to the target phoneme may be determined based on preset corresponding relationship information, to generate the face image including the mouth-shape object. Here, the corresponding relationship information may be used to represent the corresponding relationship between the phoneme and the mouth-shape object, or may be used to represent the corresponding relationship between the phoneme group and the mouth-shape object.

In some alternative implementations of this embodiment, when the mouth-shape information in the mouth-shape information sequence includes the probability that the corresponding speech segment matches the each preset phoneme (e.g., each of one or more preset phonemes), the mouth-shape information prediction model is trained and obtained through the following steps. First, a sample set may be extracted. Here, a sample in the sample set may include sample speech and a phonemic annotation for each speech segment of the sample speech. Then, for the sample in the sample set, an audio feature may be extracted from the sample speech of the sample segment by segment, to be aggregated into the audio feature sequence of the sample. Here, the approach to extracting the audio feature of the sample speech segment by segment is basically the same as the approach to extracting the audio feature of the target speech segment by segment in step 201, which will not be repeatedly described here. Thereafter, the audio feature sequence of the sample may be used as an input and the phoneme annotation in the sample may be used as an output, to train and obtain the mouth-shape information prediction model by using the machine learning method. Here, the mouth-shape information prediction model may be trained by selecting the LSTM, to solve the long term dependency problem in the traditional recurrent neural networks, which makes the trained mouth-shape information prediction model more accurate.

In some alternative implementations of this embodiment, the mouth-shape information in the mouth-shape information sequence may include the key point information of the mouth area. At this point, for the mouth-shape information in the mouth-shape information sequence, the executing body may use a key point indicated by the key point information in the mouth-shape information as a skeleton point of the mouth area of the face, to generate the face image using the existing animation production application (e.g., Unity 3D and Maya).

In some alternative implementations of this embodiment, when the mouth-shape information in the mouth-shape information sequence includes the key point information of the mouth area, the mouth-shape information prediction model may be trained and obtained through the following steps.

In the first step, a sample set may be extracted. A sample in the sample set may include a sample video and sample speech that are synchronously recorded. Here, the sample video may be adjusted (e.g., using an interpolation method) to a preset frame rate (e.g., 100 fps), such that the number of frames extracted per unit time is identical to the number of speech segments extracted per unit time.

In the second step, for the sample in the sample set, a face detection and a face key point detection may be performed on the frames in the sample video in the sample in sequence, to obtain key point information of a mouth area of each frame and aggregate the key point information into a key point information sequence. Here, the face detection may be performed on the each frame using an existing face detection method or tool (e.g., a Dlib tool), and the recognized face may be changed into the front face. Then, the face key point detection may be performed on the changed front face using various existing face key point detection methods or tools, to recognize a key point and obtain the key point information. Here, the key point information may be the coordinates of the key point (which may be two-dimensional coordinates or three-dimensional coordinates). In practice, the key point may be a crucial point in the face (e.g., a point with semantic information, or a point affecting the facial contour or shapes of five sense organs). For example, the key point may include, but not limited to, a point at an eye corner, a point at a mouth corner, a point in the contour, etc. Here, the mouth area described above may be the area related to the movement of the mouth, for example, the mouth, the nose, the chin, the tooth, and the cheeks. The key points in the mouth area may be points affecting the contours or shapes of the mouth, the nose, the chin, the tooth and the cheeks.

In the third step, an audio feature may be extracted from the sample speech of the sample segment by segment, to be aggregated into the audio feature sequence of the sample. The key point information in the key point information sequence is in one-to-one correspondence with the audio features in the audio feature sequence of the sample. Here, the approach to extracting the audio feature of the sample speech segment by segment is basically the same as the approach to extracting the audio feature of the target speech segment by segment in step 201, which will not be repeatedly described here.

In the fourth step, the key point information sequence and the audio feature sequence of the sample may be updated based on a preset delay step size. Here, it is considered that there is a certain delay between the mouth shape and the sound when people are talking. For example, when saying "I," people often open their mouth first and then utter a sound. Therefore, the key point information sequence and the audio feature sequence of the sample may be updated using the preset delay step size, to make the corresponding relationship between the key point information and the audio feature take into account the influence of the delay. Here, the delay step size may be a value preset based on statistics and experiments performed on a large amount of data by the technician. Alternatively, the updating may be performed as follows: first, an audio feature, which has a sequence number not greater than the delay step size, in the audio feature sequence of the sample is deleted, to update the audio feature sequence of the sample; then, the number of audio features in the updated audio feature sequence is determined; and finally, key point information, which has a sequence number greater than the number of audio features, in the key point information sequence is deleted, to update the key point information sequence.

In the fifth step, the updated audio feature sequence may be used as an input and the updated key point information sequence may be used as an output, to train and obtain the mouth-shape information prediction model using the machine learning method. Here, the mouth-shape information prediction model may be trained by selecting the LSTM, to solve the long term dependency problem in the traditional recurrent neural networks, which makes the trained mouth-shape information prediction model more accurate.

Step 204, using the generated face image as a key frame of a facial animation, to generate the facial animation.

In this embodiment, the executing body may use the generated face image as the key frame of the facial animation, and use the existing animation production tool (e.g., Unity 3D) to render the key frame and generate a transition animation between key frames, thus generating the facial animation. Accordingly, the synchronization of the mouth shape and the speech and the automatic generation of the animation are implemented.

Figure 3:
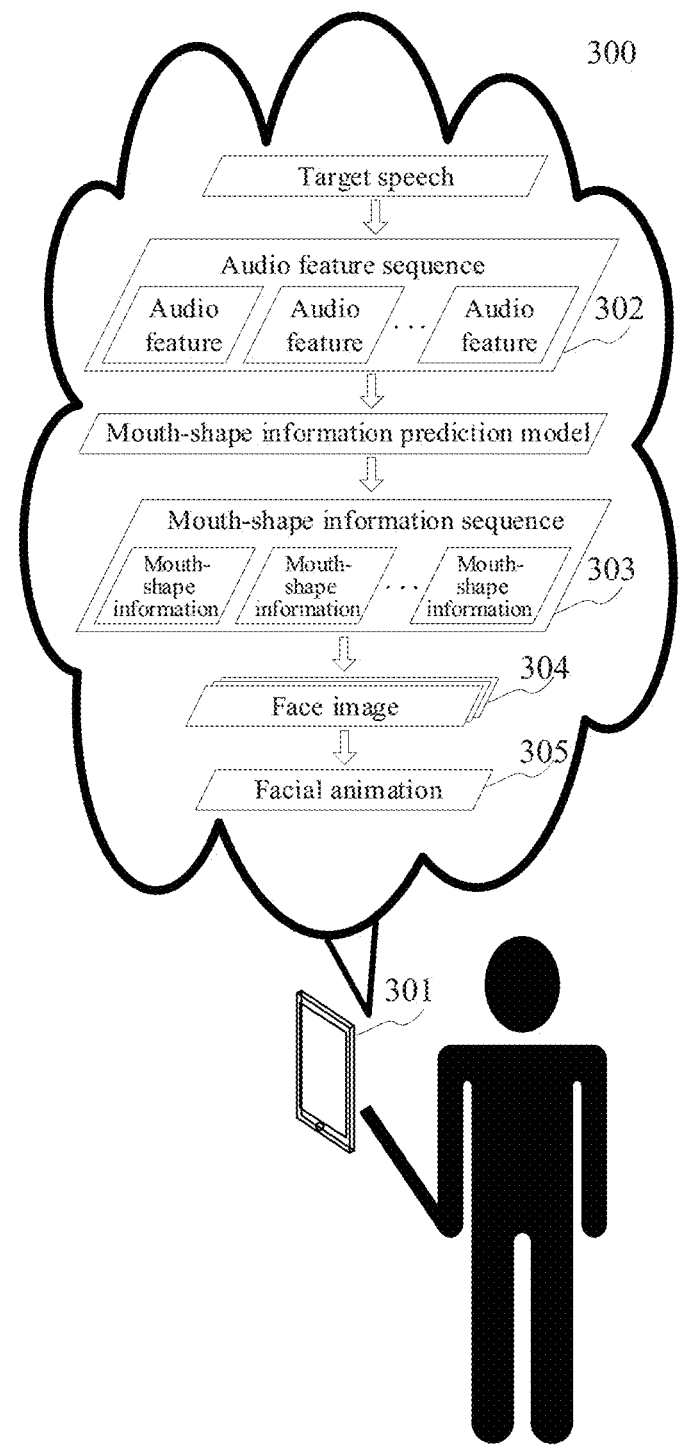
FIG. 3 is a schematic diagram of an application scenario of the method for generating animation according to an embodiment of the present disclosure.

Further referring to FIG. 3, FIG. 3 is a schematic diagram of an application scenario of the method for generating an animation according to an embodiment. In the application scenario of FIG. 3, the user may perform recording on the target speech using the terminal device 301. An animation production tool may be installed in the terminal device 301.

After the target speech is recorded, the terminal device 301 may first extract the audio feature from the target speech segment by segment, to aggregate the audio feature into the audio feature sequence 302 composed of the audio feature of the each speech segment. Then, the audio feature sequence may be inputted into the pre-trained mouth-shape information prediction model, to obtain the mouth-shape information sequence 303 corresponding to the audio feature sequence. The audio features in the audio feature sequence are in one-to-one correspondence with the mouth-shape information in the mouth-shape information sequence. Thereafter, based on the mouth-shape information in the mouth-shape information sequence, the face image 304 including the mouth-shape object indicated by the mouth-shape information may be generated. Finally, the generated face image is used as a key frame of the facial animation, and the installed animation production tool may be invoked to generate the facial animation 305.

According to the method provided by the above embodiment of the present disclosure, the audio feature is extracted from the target speech segment by segment, to be aggregated into the audio feature sequence composed of the audio feature of the each speech segment. The mouth-shape information sequence corresponding to the audio feature sequence may be obtained by inputting the audio feature sequence into the pre-trained mouth-shape information prediction model. Then, the face image including the mouth-shape object may be generated based on the mouth-shape information in the mouth-shape information sequence. Finally, the generated face image may be used as the key frame of the facial animation, to generate the facial animation. Therefore, according to the speech feature extracted from the target speech, the key frame of the corresponding mouth shape may be automatically generated in accordance with the inputted speech feature without relying on a manual operation, thus enriching the animation generation modes. At the same time, the synchronization of the mouth shape and the speech in the generated animation is implemented.

Figure 4:
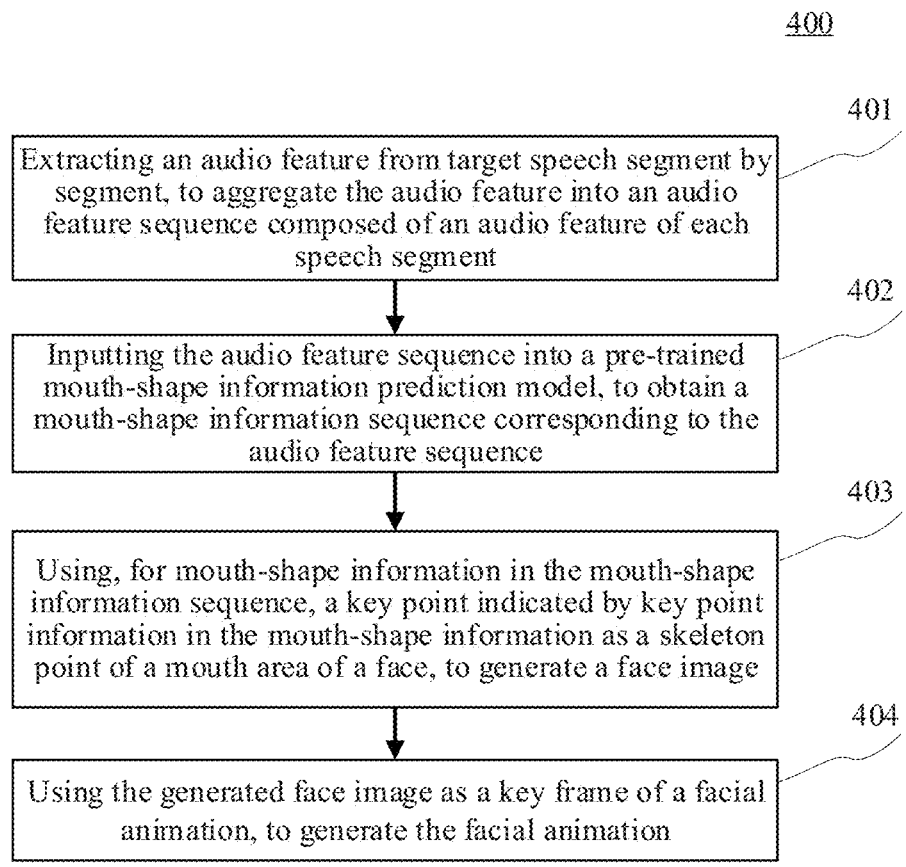
FIG. 4 is a flowchart of the method for generating animation according to another embodiment of the present disclosure.

Further referring to FIG. 4, FIG. 4 illustrates a flow 400 of the method for generating an animation according to another embodiment of the present disclosure. The flow 400 of the method for generating an animation includes the following steps.

Step 401, extracting an audio feature from target speech segment by segment, to aggregate the audio feature into an audio feature sequence composed of an audio feature of each speech segment.

In this embodiment, an executing body (e.g., the terminal devices 101, 102 and 103 shown in FIG. 1) of the method for generating an animation may extract the audio feature from target speech segment by segment, to aggregate the audio feature into the audio feature sequence composed of the audio feature of the each speech segment. Here, the feature extraction on the speech segment (e.g., a speech segment of 25 milliseconds, the each speech segment may be regarded as one frame) may be performed at a preset interval (e.g., a data amount of 10 milliseconds). The time length of the each speech segment is the same. Here, for the each speech segment, the executing body may extract respectively an MFCC feature, an MFB feature, and an SSC feature. The features are aggregated to obtain the audio feature of the speech segment. Then, the audio feature sequence of the target speech may be obtained by aggregating the audio feature of the each speech segment.

Step 402, inputting the audio feature sequence into a pre-trained mouth-shape information prediction model, to obtain a mouth-shape information sequence corresponding to the audio feature sequence.

In this embodiment, the executing body may input the audio feature sequence into the pre-trained mouth-shape information prediction model, to obtain the mouth-shape information sequence corresponding to the audio feature sequence. Here, the mouth-shape information in the mouth-shape information sequence may include key point information of a mouth area.

Here, the mouth-shape information prediction model may be trained through the following steps.

In the first step, a sample set may be extracted. A sample in the sample set may include a sample video and sample speech that are synchronously recorded. Here, the sample video may be adjusted (e.g., using an interpolation method) to a preset frame rate (e.g., 100 fps), such that the number of frames extracted per unit time is identical to the number of speech segments extracted per unit time.

In the second step, for the sample in the sample set, a face detection and a face key point detection may be performed on the frames in the sample video in the sample in sequence, to obtain key point information of a mouth area of each frame and aggregate the key point information into a key point information sequence. Here, the face detection may be performed on the each frame using an existing face detection method or tool (e.g., a Dlib tool), and the recognized face may be changed into the front face. Then, the face key point detection may be performed on the changed front face using various existing face key point detection methods or tools, to recognize a key point and obtain the key point information. Here, the key point information may be the coordinates of the key point (which may be two-dimensional coordinates or three-dimensional coordinates). In practice, the key point may be a crucial point in the face (e.g., a point with semantic information, or a point affecting the facial contour or shapes of five sense organs). For example, the key point may include, but not limited to, a point at an eye corner, a point at a mouth corner, a point in the contour, etc. Here, the mouth area described above may be the area related to the movement of the mouth, for example, mouth, nose, chin, tooth, or cheeks. The key points in the mouth area may be points affecting the contours or shapes of the mouth, the nose, the chin, the tooth and the cheeks.

In the third step, an audio feature may be extracted from the sample speech of the sample segment by segment, to be aggregated into the audio feature sequence of the sample. The key point information in the key point information sequence is in one-to-one correspondence with the audio features in the audio feature sequence of the sample.

In the fourth step, the key point information sequence and the audio feature sequence of the sample may be updated based on a preset delay step size. Here, it is considered that there is a certain delay between the mouth shape and the sound when people are talking. For example, when saying "I," people often open their mouth first and then utter a sound. Therefore, the key point information sequence and the audio feature sequence of the sample may be updated using the preset delay step size, to make the corresponding relationship between the key point information and the audio feature take into account the influence of the delay. Here, the delay step size may be a value preset based on statistics and experiments performed on a large amount of data by a technician. Alternatively, the updating may be performed as follows: first, an audio feature, which has a sequence number not greater than the delay step size, in the audio feature sequence of the sample is deleted, to update the audio feature sequence of the sample; then, the number of audio features in the updated audio feature sequence is determined; and finally, key point information, which has a sequence number greater than the number of audio features, in the key point information sequence is deleted, to update the key point information sequence.

In the fifth step, the updated audio feature sequence may be used as an input, and the updated key point information sequence may be used as an output, to train and obtain the mouth-shape information prediction model using a machine learning method. Here, the mouth-shape information prediction model may be trained by selecting an LSTM, to solve the long term dependency problem in the traditional recurrent neural networks, which makes the trained mouth-shape information prediction model more accurate.

Step 403, using, for mouth-shape information in the mouth-shape information sequence, a key point indicated by key point information in the mouth-shape information as a skeleton point of a mouth area of a face, to generate a face image.

In this embodiment, for the mouth-shape information in the mouth-shape information sequence, the executing body may use the key point indicated by the key point information in the mouth-shape information as the skeleton point of the mouth area of the face, to generate the face image using an existing animation production applications (e.g., Unity 3D and Maya).

Step 404, using the generated face image as a key frame of a facial animation, to generate the facial animation.

In this embodiment, the executing body may use the generated face image as the key frame of the facial animation, and use the existing animation production tool (e.g., Unity 3D) to render the key frame and generate a transition animation between key frames, thus generating the facial animation. Accordingly, the synchronization of the mouth shape and the speech and the automatic generation of the animation are implemented.

It may be seen from FIG. 4 that, as compared with the embodiment corresponding to FIG. 2, the flow 400 of the method for generating an animation in this embodiment involves the content that the key point information of the mouth area is obtained using the mouth-shape information prediction model trained using the LSTM model. Therefore, the face image may be obtained based on the obtained key point information. In this scheme, the sample set of training the mouth-shape information prediction model is more easily obtained. It only needs to include the video of the speaking of a person without relying on a manual annotation for the phoneme. Thus, according to the scheme described in this embodiment, the prediction for the mouth-shape information may be performed more flexibly and conveniently. At the same time, information such as an emotion and a volume level in the speech may be captured, and thus, a face image having richer information is determined based on the inputted speech.

Figure 5:
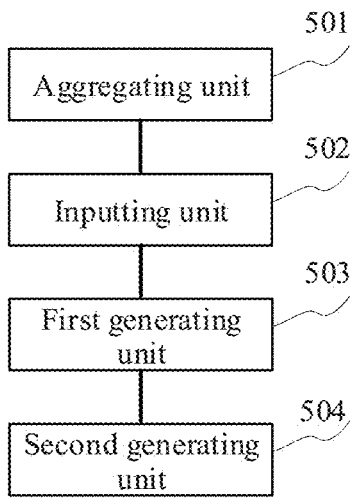
FIG. 5 is a schematic structural diagram of an apparatus for generating animation according to an embodiment of the present disclosure.

Further referring to FIG. 5, as an implementation of the method shown in the above drawings, an embodiment of the present disclosure provides an apparatus for generating an animation. The embodiment of the apparatus corresponds to the embodiment of the method shown in FIG. 2, and the apparatus may be applied in various electronic devices.

As shown in FIG. 5, the apparatus 500 for generating an animation in this embodiment includes: an aggregating unit 501, configured to extract an audio feature from target speech segment by segment, to aggregate the audio feature into an audio feature sequence composed of an audio feature of each speech segment; an inputting unit 502, configured to input the audio feature sequence into a pre-trained mouth-shape information prediction model, to obtain a mouth-shape information sequence corresponding to the audio feature sequence, audio features in the audio feature sequence being in one-to-one correspondence with mouth-shape information in the mouth-shape information sequence; a first generating unit 503, configured to generate, for the mouth-shape information in the mouth-shape information sequence, a face image including a mouth-shape object indicated by the mouth-shape information; and a second generating unit 504, configured to use the generated face image as a key frame of a facial animation, to generate the facial animation.

In some alternative implementations of this embodiment, the mouth-shape information in the mouth-shape information sequence may include a probability of a corresponding speech segment matching each preset phoneme. The first generating unit 503 may be further configured to: use, for the mouth-shape information in the mouth-shape information sequence, a preset phoneme corresponding to a maximum value of the probability in the mouth-shape information as a target phoneme, and determine, based on preset corresponding relationship information, a mouth-shape object corresponding to the target phoneme to generate a face image including the mouth-shape object, the corresponding relationship information being used to represent a corresponding relationship between the phoneme and the mouth-shape object.

In some alternative implementations of this embodiment, the mouth-shape information prediction model may be obtained by following training: extracting a sample set, where a sample in the sample set includes sample speech and a phonemic annotation for each speech segment of the sample speech; extracting, for the sample in the sample set, an audio feature from the sample speech of the sample segment by segment, to aggregate the audio feature into an audio feature sequence of the sample; and using the audio feature sequence of the sample as an input and using the phonemic annotation in the sample as an output, to train and obtain the mouth-shape information prediction model using a machine learning method.

In some alternative implementations of this embodiment, the mouth-shape information in the mouth-shape information sequence may include key point information of a mouth area. The first generating unit 503 may be further configured to: use, for the mouth-shape information in the mouth-shape information sequence, a key point indicated by the key point information in the mouth-shape information as a skeleton point of the mouth area of a face, to generate the face image.

In some alternative implementations of this embodiment, the mouth-shape information prediction model may be obtained by following training: extracting a sample set, where a sample in the sample set includes a sample video and sample speech synchronously recorded; performing, for the sample in the sample set, a face detection and a face key point detection on frames in the sample video in the sample in sequence, to obtain key point information of a mouth area of each frame and aggregate the key point information into a key point information sequence; extracting an audio feature from the sample speech of the sample segment by segment, to aggregate the audio feature into an audio feature sequence of the sample, the key point information in the key point information sequence being in one-to-one correspondence with audio features in the audio feature sequence of the sample; updating the key point information sequence and the audio feature sequence of the sample based on a preset delay step size; and using the updated audio feature sequence as an input and using the updated key point information sequence as an output, to train and obtain the mouth-shape information prediction model using the machine learning method.

In some alternative implementations of this embodiment, the updating the key point information sequence and the audio feature sequence of the sample based on a preset delay step size includes: deleting an audio feature, having a sequence number not greater than the delay step size, in the audio feature sequence of the sample, to update the audio feature sequence of the sample; determining a number of audio features in the updated audio feature sequence; and deleting key point information, having a sequence number greater than the number of audio features, in the key point information sequence, to update the key point information sequence.

According to the apparatus for generating an animation provided by the above embodiment of the present disclosure, the aggregating unit 501 extracts the audio feature from the target speech segment by segment, to aggregate the audio feature into the audio feature sequence composed of the audio feature of the each speech segment. The inputting unit 502 inputs the audio feature sequence into the pre-trained mouth-shape information prediction model, and thus, the mouth-shape information sequence corresponding to the audio feature sequence may be obtained. Then, the first generating unit 503 may generate the face image including the mouth-shape object based on the mouth-shape information in the mouth-shape information sequence. Finally, the second generating unit 504 may use the generated face image as the key frame of the facial animation, to generate the facial animation. According to the speech feature extracted from the target speech, the key frame of the corresponding mouth shape may be automatically generated in accordance with the inputted speech feature without relying on a manual operation, thus enriching the animation generation modes and implementing the synchronization of the mouth shape and the speech in the generated animation.

Figure 6:
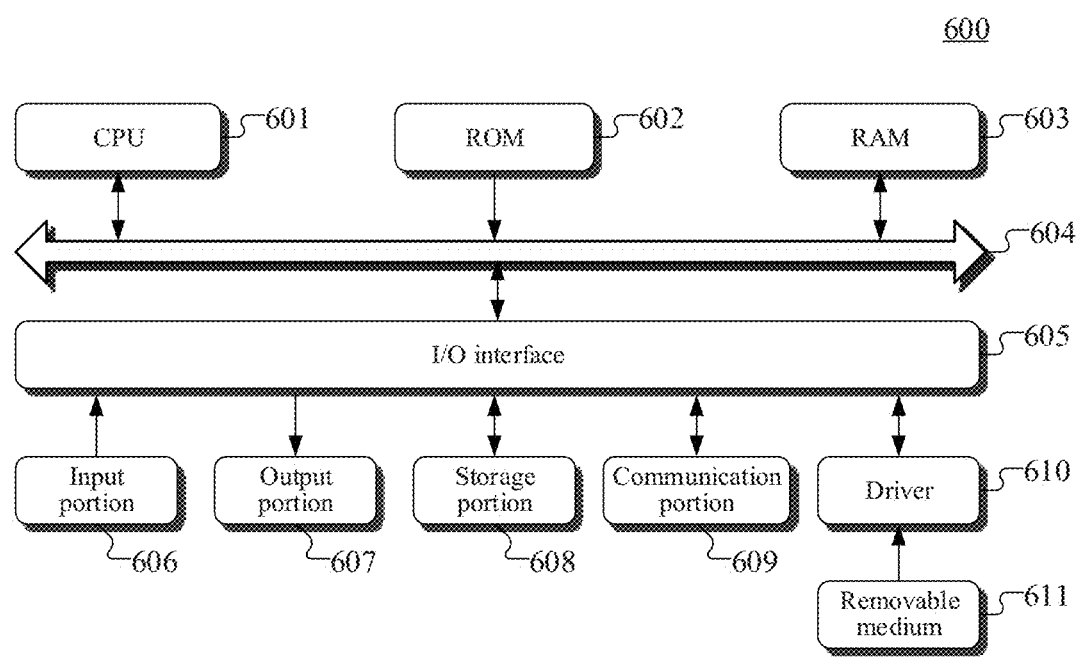
FIG. 6 is a schematic structural diagram of a computer system adapted to implement an electronic device according to embodiments of the present disclosure.

Referring to FIG. 6, FIG. 6 is a schematic structural diagram of a computer system 600 adapted to implement an electronic device of the embodiments of the present disclosure. The electronic device shown in FIG. 6 is merely an example, and should not bring any limitations to the functionalities and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a touch screen, a touch pad, etc.; an output portion 607 including a liquid crystal display device (LCD), a speaker etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a semiconductor memory may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functionalities and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functionalities. It should also be noted that, in some alternative implementations, the functionalities denoted by the blocks may occur in a sequence different from the sequences shown in the figures. For example, any two blocks presented in succession may be executed substantially in parallel, or they may sometimes be executed in a reverse sequence, depending on the functionality involved. It should also be noted that each block in the block diagrams and/or flowcharts as well as a combination of blocks may be implemented using a dedicated hardware-based system executing specified functionalities or operations, or by a combination of dedicated hardware and computer instructions.

The units involved in the embodiments of the present disclosure may be implemented by means of software or hardware. The described units may also be provided in a processor. For example, the processor may be described as: a processor comprising an aggregating unit, an inputting unit, a first generating unit and a second generating unit. The names of these units do not in some cases constitute a limitation to such units themselves. For example, the aggregating unit may alternatively be described as "a unit for extracting an audio feature from target speech segment by segment, to aggregate the audio feature into an audio feature sequence composed of an audio feature of each speech segment."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: extract an audio feature from target speech segment by segment, to aggregate the audio feature into an audio feature sequence composed of an audio feature of each speech segment; input the audio feature sequence into a pre-trained mouth-shape information prediction model, to obtain a mouth-shape information sequence corresponding to the audio feature sequence; generate, based on mouth-shape information in the mouth-shape information sequence, a face image including a mouth-shape object indicated by the mouth-shape information; and use the generated face image as a key frame of a facial animation, to generate the facial animation The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functionalities.

What is claimed is:

1. A method for generating an animation, comprising:
   extracting an audio feature from target speech segment by segment, to aggregate the audio feature into an audio feature sequence composed of an audio feature of each speech segment;
   obtaining a mouth-shape information sequence corresponding to the audio feature sequence by inputting the audio feature sequence into a pre-trained mouth-shape information prediction model, audio features in the audio feature sequence being in one-to-one correspondence with mouth-shape information in the mouth-shape information sequence, wherein the mouth-shape information in the mouth-shape information sequence comprises: a phoneme matching the speech segment, a probability of a corresponding speech segment matching each of one or more preset phonemes, and key point information of a mouth area;
   generating, for the mouth-shape information in the mouth-shape information sequence, a face image including a mouth-shape object indicated by the mouth-shape information; and
   using the generated face image as a key frame of a facial animation, to generate the facial animation.

2. The method according to claim 1,
   wherein the generating, for the mouth-shape information in the mouth-shape information sequence, the face image including the mouth-shape object indicated by the mouth-shape information comprises:
   using, for the mouth-shape information in the mouth-shape information sequence, a preset phoneme corresponding to a maximum value of the probability in the mouth-shape information as a target phoneme, and
   determining, based on preset corresponding relationship information, the mouth-shape object corresponding to the target phoneme to generate the face image including the mouth-shape object, the preset corresponding relationship information representing a corresponding relationship between the target phoneme and the mouth-shape object.

3. The method according to claim 2, wherein the pre-trained mouth-shape information prediction model is obtained by training comprising:
   extracting a sample set, wherein a sample in the sample set comprises sample speech and a phonemic annotation for each speech segment of the sample speech; and
   extracting, for the sample in the sample set, an audio feature from the sample speech of the sample segment by segment, to aggregate the audio feature into the audio feature sequence of the sample; and
   using the audio feature sequence of the sample as an input and using the phonemic annotation in the sample as an output, to train and obtain the pre-trained mouth-shape information prediction model using a machine learning method.

4. The method according to claim 1,
   wherein the generating, for the mouth-shape information in the mouth-shape information sequence, the face image including the mouth-shape object indicated by the mouth-shape information comprises:
      using, for the mouth-shape information in the mouth-shape information sequence, a key point indicated by the key point information in the mouth-shape information as a skeleton point of the mouth area of a face, to generate the face image.

5. The method according to claim 4, wherein the pre-trained mouth-shape information prediction model is obtained by training comprising:
   extracting a sample set, wherein a sample in the sample set comprises a sample video and sample speech synchronously recorded;
   performing, for the sample in the sample set, a face detection and a face key point detection on frames in the sample video in the sample in sequence, to obtain the key point information of a mouth area of each frame and aggregate the key point information into a key point information sequence;
   extracting an audio feature from the sample speech of the sample segment by segment, to aggregate the audio feature into the audio feature sequence of the sample, the key point information in the key point information sequence being in one-to-one correspondence with audio features in the audio feature sequence of the sample;
   updating the key point information sequence and the audio feature sequence of the sample based on a preset delay step size; and
   using the updated audio feature sequence as an input and using the updated key point information sequence as an output, to train and obtain the pre-trained mouth-shape information prediction model using a machine learning method.

6. The method according to claim 5, wherein the updating the key point information sequence and the audio feature sequence of the sample based on the preset delay step size comprises:
   deleting an audio feature, having a sequence number not greater than the preset delay step size, in the audio feature sequence of the sample, to update the audio feature sequence of the sample;
   determining a number of audio features in the updated audio feature sequence; and
   deleting the key point information, having a sequence number greater than the number of audio features, in the key point information sequence, to update the key point information sequence.

7. An apparatus for generating an animation, comprising:
   at least one processor; and
   a memory storing instructions, wherein the instructions when executed by the at least one processor, cause the at least one processor to perform operations, the operations comprising:
      extracting an audio feature from target speech segment by segment, to aggregate the audio feature into an audio feature sequence composed of an audio feature of each speech segment;
      obtaining a mouth-shape information sequence corresponding to the audio feature sequence by inputting the audio feature sequence into a pre-trained mouth-shape information prediction model, audio features in the audio feature sequence being in one-to-one correspondence with mouth-shape information in the mouth-shape information sequence, wherein the mouth-shape information in the mouth-shape information sequence comprises: a phoneme matching the speech segment, a probability of a corresponding speech segment matching each of one or more preset phonemes, and key point information of a mouth area;
      generating, for the mouth-shape information in the mouth-shape information sequence, a face image including a mouth-shape object indicated by the mouth-shape information; and
      using the generated face image as a key frame of a facial animation, to generate the facial animation.

8. The apparatus according to claim 7,
   wherein the generating, for the mouth-shape information in the mouth-shape information sequence, the face image including the mouth-shape object indicated by the mouth-shape information comprises:
      using, for the mouth-shape information in the mouth-shape information sequence, a preset phoneme corresponding to a maximum value of the probability in the mouth-shape information as a target phoneme, and
      determining, based on preset corresponding relationship information, the mouth-shape object corresponding to the target phoneme to generate the face image including the mouth-shape object, the preset corresponding relationship information representing a corresponding relationship between the target phoneme and the mouth-shape object.

9. The apparatus according to claim 8, wherein the pre-trained mouth-shape information prediction model is obtained by training comprising:
   extracting a sample set, wherein a sample in the sample set comprises sample speech and a phonemic annotation for each speech segment of the sample speech;
   extracting, for the sample in the sample set, an audio feature from the sample speech of the sample segment by segment, to aggregate the audio feature into the audio feature sequence of the sample; and
   using the audio feature sequence of the sample as an input and using the phonemic annotation in the sample as an output, to train and obtain the pre-trained mouth-shape information prediction model using a machine learning method.

10. The apparatus according to claim 7,
    wherein the generating, for the mouth-shape information in the mouth-shape information sequence, the face image including the mouth-shape object indicated by the mouth-shape information comprises:
using, for the mouth-shape information in the mouth-shape information sequence, a key point indicated by the key point information in the mouth-shape information as a skeleton point of the mouth area of a face, to generate the face image.

11. The apparatus according to claim 10, wherein the pre-trained mouth-shape information prediction model is obtained by training comprising:
extracting a sample set, wherein a sample in the sample set comprises a sample video and sample speech synchronously recorded;
performing, for the sample in the sample set, a face detection and a face key point detection on frames in the sample video in the sample in sequence, to obtain the key point information of a mouth area of each frame and aggregate the key point information into a key point information sequence;
extracting an audio feature from the sample speech of the sample segment by segment, to aggregate the audio feature into the audio feature sequence of the sample, the key point information in the key point information sequence being in one-to-one correspondence with audio features in the audio feature sequence of the sample;
updating the key point information sequence and the audio feature sequence of the sample based on a preset delay step size; and
using the updated audio feature sequence as an input and using the updated key point information sequence as an output, to train and obtain the pre-trained mouth-shape information prediction model using a machine learning method.

12. The apparatus according to claim 11, wherein the updating the key point information sequence and the audio feature sequence of the sample based on the preset delay step size comprises:
deleting an audio feature, having a sequence number not greater than the preset delay step size, in the audio feature sequence of the sample, to update the audio feature sequence of the sample;
determining a number of audio features in the updated audio feature sequence; and
deleting the key point information, having a sequence number greater than the number of audio features, in the key point information sequence, to update the key point information sequence.

13. A non-transitory computer readable medium, storing a computer program, wherein the computer program, when executed by a processor, causes the processor to perform operations, the operations comprising:
extracting an audio feature from target speech segment by segment, to aggregate the audio feature into an audio feature sequence composed of an audio feature of each speech segment;
obtaining a mouth-shape information sequence corresponding to the audio feature sequence by inputting the audio feature sequence into a pre-trained mouth-shape information prediction model, audio features in the audio feature sequence being in one-to-one correspondence with mouth-shape information in the mouth-shape information sequence, wherein the mouth-shape information in the mouth-shape information sequence comprises: a phoneme matching the speech segment, a probability of a corresponding speech segment matching each of one or more preset phonemes, and key point information of a mouth area;
generating, for the mouth-shape information in the mouth-shape information sequence, a face image including a mouth-shape object indicated by the mouth-shape information; and
using the generated face image as a key frame of a facial animation, to generate the facial animation.

14. The non-transitory computer readable medium according to claim 13,
wherein the generating, for the mouth-shape information in the mouth-shape information sequence, the face image including the mouth-shape object indicated by the mouth-shape information comprises:
using, for the mouth-shape information in the mouth-shape information sequence, a preset phoneme corresponding to a maximum value of the probability in the mouth-shape information as a target phoneme, and
determining, based on preset corresponding relationship information, the mouth-shape object corresponding to the target phoneme to generate the face image including the mouth-shape object, the preset corresponding relationship information representing a corresponding relationship between the target phoneme and the mouth-shape object.

15. The non-transitory computer readable medium according to claim 14, wherein the pre-trained mouth-shape information prediction model is obtained by training comprising:
extracting a sample set, wherein a sample in the sample set comprises sample speech and a phonemic annotation for each speech segment of the sample speech;
extracting, for the sample in the sample set, an audio feature from the sample speech of the sample segment by segment, to aggregate the audio feature into the audio feature sequence of the sample; and
using the audio feature sequence of the sample as an input and using the phonemic annotation in the sample as an output, to train and obtain the pre-trained mouth-shape information prediction model using a machine learning method.

16. The non-transitory computer readable medium according to claim 13,
wherein the generating, for the mouth-shape information in the mouth-shape information sequence, the face image including the mouth-shape object indicated by the mouth-shape information comprises:
using, for the mouth-shape information in the mouth-shape information sequence, a key point indicated by the key point information in the mouth-shape information as a skeleton point of the mouth area of a face, to generate the face image.

17. The non-transitory computer readable medium according to claim 16, wherein the pre-trained mouth-shape information prediction model is obtained by training comprising:
extracting a sample set, wherein a sample in the sample set comprises a sample video and sample speech synchronously recorded;
performing, for the sample in the sample set, a face detection and a face key point detection on frames in the sample video in the sample in sequence, to obtain the key point information of a mouth area of each frame and aggregate the key point information into a key point information sequence;

extracting an audio feature from the sample speech of the sample segment by segment, to aggregate the audio feature into the audio feature sequence of the sample, the key point information in the key point information sequence being in one-to-one correspondence with audio features in the audio feature sequence of the sample;

updating the key point information sequence and the audio feature sequence of the sample based on a preset delay step size; and using the updated audio feature sequence as an input and using the updated key point information sequence as an output, to train and obtain the pre-trained mouth-shape information prediction model using a machine learning method.

18. The non-transitory computer readable medium according to claim 17, wherein the updating the key point information sequence and the audio feature sequence of the sample based on the preset delay step size comprises:

deleting an audio feature, having a sequence number not greater than the preset delay step size, in the audio feature sequence of the sample, to update the audio feature sequence of the sample;

determining a number of audio features in the updated audio feature sequence; and deleting the key point information, having a sequence number greater than the number of audio features, in the key point information sequence, to update the key point information sequence.

\* \* \* \* \*